United States Patent
Hovis et al.

(10) Patent No.: US 9,932,853 B2
(45) Date of Patent: Apr. 3, 2018

(54) ASSEMBLIES AND METHODS FOR MONITORING TURBINE COMPONENT STRAIN

(71) Applicant: General Electric Company, Schenectady, NY (US)

(72) Inventors: Gregory Lee Hovis, Martinez, GA (US); Blake Ashton Nickles, Greenville, SC (US); William F. Ranson, Columbia, SC (US); Robert William Davidoff, Greenville, SC (US)

(73) Assignee: General Electric Company, Schenectady, NY (US)

( * ) Notice: Subject to any disclaimer, the term of this patent is extended or adjusted under 35 U.S.C. 154(b) by 324 days.

(21) Appl. No.: 14/697,766

(22) Filed: Apr. 28, 2015

(65) Prior Publication Data

US 2016/0319694 A1    Nov. 3, 2016

(51) Int. Cl.
| | | |
|---|---|---|
| G01B 5/30 | (2006.01) | |
| F01D 21/00 | (2006.01) | |
| G01L 1/22 | (2006.01) | |
| F01D 17/04 | (2006.01) | |

(52) U.S. Cl.
CPC ............ *F01D 21/003* (2013.01); *F01D 17/04* (2013.01); *G01L 1/22* (2013.01); *F05D 2260/80* (2013.01); *F05D 2260/83* (2013.01)

(58) Field of Classification Search
CPC ......... F01D 21/003; F01D 17/04; G01L 1/22; F05D 2260/80; F05D 2260/83
USPC .......................................................... 73/760
See application file for complete search history.

(56) References Cited

U.S. PATENT DOCUMENTS

| | | |
|---|---|---|
| 4,528,856 A | 7/1985 | Junker et al. |
| 4,746,858 A | 5/1988 | Metala et al. |
| 4,782,705 A | 11/1988 | Hoffmann et al. |
| 4,859,062 A | 8/1989 | Thurn et al. |
| 6,078,396 A | 6/2000 | Manzouri |
| 6,175,644 B1 | 1/2001 | Scola et al. |
| 6,574,363 B1 | 6/2003 | Classen et al. |
| 6,983,659 B2 | 1/2006 | Soechting et al. |
| 6,986,287 B1 | 1/2006 | Dorfman |
| 7,200,259 B1 | 4/2007 | Gold et al. |
| 7,227,648 B2 | 6/2007 | Weinhold |
| 7,414,732 B2 | 8/2008 | Maidhof et al. |
| 7,421,370 B2 | 9/2008 | Jain et al. |

(Continued)

FOREIGN PATENT DOCUMENTS

WO    WO 2014/031957    2/2014

*Primary Examiner* — Max Noori
(74) *Attorney, Agent, or Firm* — Dority & Manning, P.A.

(57) ABSTRACT

Assemblies and methods for monitoring turbine component deformation are provided. An assembly includes a first strain sensor configurable on the turbine component, the first strain sensor including at least two reference points and having a first dimension. The assembly further includes a second strain sensor configurable on the turbine component, the second strain sensor including at least two reference points and having a first dimension which corresponds to the first dimension of the first strain sensor. An initial value of the first dimension of the second strain sensor is different from an initial value of the first dimension of the first strain sensor. In accordance with another embodiment of the present disclosure, a method for monitoring turbine component deformation is provided.

20 Claims, 4 Drawing Sheets

(56) References Cited

U.S. PATENT DOCUMENTS

| | | |
|---|---|---|
| 7,441,464 B2 | 10/2008 | Turnbull et al. |
| 7,477,995 B2 | 1/2009 | Hovis et al. |
| 7,490,522 B2 | 2/2009 | Ruehrig et al. |
| 7,533,818 B2 | 5/2009 | Hovis et al. |
| 7,689,003 B2 | 3/2010 | Shannon et al. |
| 7,697,966 B2 | 4/2010 | Monfre et al. |
| 7,849,752 B2 | 12/2010 | Gregory et al. |
| 8,098,247 B2 | 1/2012 | Crucs |
| 8,245,578 B2 | 8/2012 | Ranson et al. |
| 8,307,715 B2 | 11/2012 | Ranson |
| 8,600,147 B2 | 12/2013 | Iliopoulos et al. |
| 8,994,845 B2 | 3/2015 | Mankowski |
| 9,128,063 B2 | 9/2015 | Dooley |
| 9,200,889 B2 | 12/2015 | Swiergiel et al. |
| 9,207,154 B2 | 12/2015 | Harding et al. |
| 9,311,566 B2 | 4/2016 | Iliopoulos et al. |
| 2013/0013224 A1 | 1/2013 | Ito et al. |
| 2013/0125632 A1* | 5/2013 | Bjerge ................ F03D 11/0091 73/112.01 |
| 2013/0194567 A1 | 8/2013 | Wan et al. |
| 2013/0202192 A1 | 8/2013 | Telfer et al. |
| 2014/0000380 A1 | 1/2014 | Slowik et al. |
| 2014/0267677 A1 | 9/2014 | Ward, Jr. et al. |
| 2015/0211969 A1* | 7/2015 | Muller ................ G01P 15/093 73/849 |
| 2015/0239043 A1 | 8/2015 | Shipper, Jr. et al. |
| 2016/0161242 A1 | 6/2016 | Cook et al. |
| 2016/0313114 A1 | 10/2016 | Tohme et al. |
| 2016/0354174 A1* | 12/2016 | Demir .................... A61B 90/06 |

\* cited by examiner

ASSEMBLIES AND METHODS FOR MONITORING TURBINE COMPONENT STRAIN

FIELD OF THE INVENTION

The present disclosure relates generally to assemblies and methods for monitoring turbine component strain, and more particularly to assemblies and methods which utilize strain sensors having non-uniform dimensions.

BACKGROUND OF THE INVENTION

Turbomachines are widely utilized in fields such as power generation and aircraft engines. For example, a conventional gas turbine system includes a compressor section, a combustor section, and at least one turbine section. The compressor section is configured to compress air as the air flows through the compressor section. The air is then flowed from the compressor section to the combustor section, where it is mixed with fuel and combusted, generating a hot gas flow. The hot gas flow is provided to the turbine section, which utilizes the hot gas flow by extracting energy from it to power the compressor, an electrical generator, and other various loads.

During operation of a turbomachine, various components (collectively known as turbine components) within the turbomachine and particularly within the turbine section of the turbomachine, such as turbine blades, may be subject to creep due to high temperatures and stresses. For turbine blades, creep may cause portions of or the entire blade to elongate so that the blade tips contact a stationary structure, for example a turbine casing, and potentially cause unwanted vibrations and/or reduced performance during operation.

Accordingly, it is desirable to monitor turbine components for creep. One approach to monitoring turbine components for creep is to configure strain sensors on the components, and analyze the strain sensors at various intervals to monitor for deformations associated with creep strain. One concern with such approach, however, is improper or unauthorized use of the strain sensors by unauthorized personnel.

Accordingly, alternative assemblies and methods for monitoring turbine component strain are desired in the art. In particular, assemblies and methods which reduce the risk of unauthorized use of associated strain sensors would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, an assembly for monitoring turbine component deformation is provided. The assembly includes a first strain sensor configurable on the turbine component, the first strain sensor including at least two reference points and having a first dimension. The assembly further includes a second strain sensor configurable on the turbine component, the second strain sensor including at least two reference points and having a first dimension which corresponds to the first dimension of the first strain sensor. An initial value of the first dimension of the second strain sensor is different from an initial value of the first dimension of the first strain sensor.

In accordance with another embodiment of the present disclosure, a method for monitoring turbine component deformation is provided. The method includes measuring a value of a first dimension of a first strain sensor and a value of a first dimension of a second strain sensor configured on the turbine component. The first dimension of the second strain sensor corresponds to the first dimension of the first strain sensor. The method further includes retrieving from a computing device an initial value for the first dimension of the first strain sensor and an initial value for the first dimension of the second strain sensor. The initial value of the first dimension of the second strain sensor is different from the initial value of the first dimension of the first strain sensor. The method further includes comparing the measured value of the first dimension of the first strain sensor with the initial value of the first dimension of the first strain sensor and the measured value of the first dimension of the second strain sensor with the initial value of the first dimension of the second strain sensor.

In some embodiments, a method in accordance with the present disclosure further includes determining a reference value for the first dimension of the first strain sensor and the first dimension of the second strain sensor. A method may further include modifying the reference value based on a first mathematical operation to obtain the initial value for the first dimension of the first strain sensor and modifying the reference value based on a second mathematical operation to obtain the initial value for the first dimension of the second strain sensor. The method may further include storing at least one of the reference value, the first and second mathematical operations or the initial values for the first dimensions of the first and second strain sensors in a computing device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
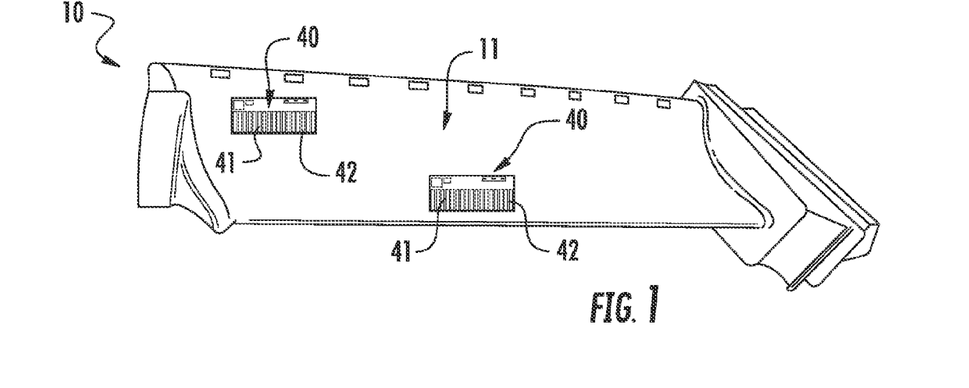
FIG. 1 is a perspective view of an exemplary turbine component comprising a plurality of strain sensors in accordance with one embodiment of the present disclosure.

Referring now to FIG. 1, a turbine component 10 is illustrated with plurality of strain sensors 40 configured thereon. The turbine component 10 can comprise a variety of specific components such as those utilized in high temperature applications (e.g., components comprising nickel or cobalt based superalloys). For example, in some embodiments, the turbine component 10 may comprise a combustion component or hot gas path component. In some particular embodiments, the turbine component 10 may comprise a bucket, blade, vane, nozzle, shroud, rotor, transition piece or casing. In other embodiments, the turbine component 10 may comprise any other component of a turbine such as a component for a gas turbine, industrial gas turbine, steam turbine or the like.

The turbine component 10 has an exterior surface 11 on or beneath which strain sensors 40 may be configured. Strain sensors 40 in accordance with the present disclosure may be configured on the exterior surface 11 using any suitable techniques, including deposition techniques; other suitable additive manufacturing techniques; subtractive techniques such as laser ablation, engraving, machining, etc.; appearance-change techniques such as annealing, direct surface discoloration, or techniques to cause local changes in reflectivity; mounting of previously formed strain sensors 40 using suitable mounting apparatus or techniques such as adhering, welding, brazing, etc.; or identifying pre-existing characteristics of the exterior surface 11 that can function as the components of a strain sensor 40. Additionally, in further alternative embodiments, strain sensors 40 can be configured beneath exterior surface 11 using suitable embedding techniques during or after manufacturing of the turbine component 10.

Figure 2:
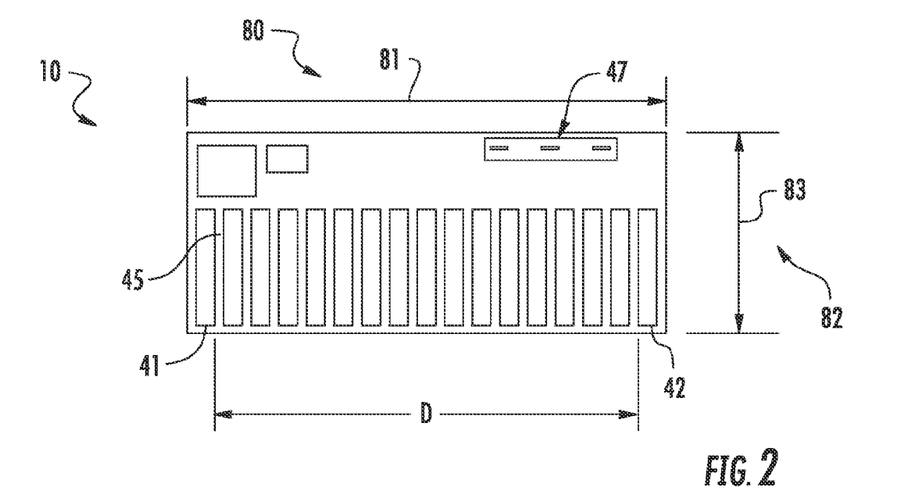
FIG. 2 is a top view of an exemplary strain sensor in accordance with one embodiment of the present disclosure.

Referring now to FIGS. 1 and 2, a strain sensor 40 generally comprises at least two reference points 41 and 42 that can be used to measure a distance D between said at least two reference points 41 and 42 at a plurality of time intervals. As should be appreciated to those skilled in the art, these measurements can help determine the amount of strain, strain rate, creep, fatigue, stress, etc. at that region of the turbine component 10. The at least two reference points 41 and 42 can be disposed at a variety of distances and in a variety of locations depending on the specific turbine component 10 so long as the distance D there between can be measured. Moreover, the at least two reference points 41 and 42 may comprise dots, lines, circles, boxes or any other geometrical or non-geometrical shape so long as they are consistently identifiable and may be used to measure the distance D there between.

The strain sensor 40 may comprise a variety of different configurations and cross-sections such as by incorporating a variety of differently shaped, sized, and positioned reference points 41 and 42. For example, as illustrated in FIG. 2, the strain sensor 40 may comprise a variety of different reference points comprising various shapes and sizes. Such embodiments may provide for a greater variety of distance measurements D such as between the outer most reference points (as illustrated), between two internal or external reference points, or any combination there between. The greater variety may further provide a more robust strain analysis on a particular portion of the turbine component 10 by providing strain measurements across a greater variety of locations.

Furthermore, the values of various dimensions of the strain sensor 40 may depend on, for example, the turbine component 10, the location of the strain sensor 40, the targeted precision of the measurement, application technique, and optical measurement technique. For example, in some embodiments, the strain sensor 40 may comprise a length and width ranging from less than 1 millimeter to greater than 300 millimeters. Moreover, the strain sensor 40 may comprise any thickness that is suitable for application and subsequent optical identification without significantly impacting the performance of the underlying turbine component 10. Notably, this thickness may be a positive thickness away from the surface 11 (such as when additive techniques are utilized) or a negative thickness into the surface 11 (such as when subtractive techniques are utilized). For example, in some embodiments, the strain sensor 40 may comprise a thickness of less than from about 0.01 millimeters to greater than 1 millimeter. In some embodiments, the strain sensor 40 may have a substantially uniform thickness. Such embodiments may help facilitate more accurate measurements for subsequent strain calculations between the first and second reference points 41 and 42.

In some embodiments, the strain sensor 40 may comprise a positively applied square or rectangle wherein the first and second reference points 41 and 42 comprise two opposing sides of said square or rectangle. In other embodiments, the strain sensor 40 may comprise at least two applied reference points 41 and 42 separated by a negative space 45 (i.e., an area in which the strain sensor material is not applied). The negative space 45 may comprise, for example, an exposed portion of the exterior surface 11 of the turbine component 10. Alternatively or additionally, the negative space 45 may comprise a subsequently applied visually contrasting material that is distinct from the material of the at least two reference points 41 and 42 (or vice versa).

As illustrated in FIG. 2, in some embodiments, the strain sensor 40 may include a unique identifier 47 (hereinafter "UID"). The UID 47 may comprise any type of barcode, label, tag, serial number, pattern or other identifying system that facilitates the identification of that particular strain sensor 40. In some embodiments, the UID 47 may additionally or alternatively comprise information about the turbine component 10 or the overall turbine that the strain sensor 40 is configured on. The UID 47 may thereby assist in the identification and tracking of particular strain sensors 40, turbine components 10 or even overall turbines to help correlate measurements for past, present and future operational tracking.

The strain sensor 40 may thereby be configured in one or more of a variety of locations of various turbine components 10. For example, as discussed above, the strain sensor 40 may be configured on a bucket, blade, vane, nozzle, shroud, rotor, transition piece or casing. In such embodiments, the strain sensor 40 may be configured in one or more locations known to experience various forces during unit operation such as on or proximate airfoils, platforms, tips or any other suitable location. Moreover, the strain sensor 40 may be configured in one or more locations known to experience elevated temperatures. For example, the strain sensor 40 may be configured on a hot gas path or combustion turbine component 10.

As discussed herein and as shown in FIG. 1, multiple strain sensors 40 may be configured on a single turbine component 10 or on multiple turbine components 10. For example, a plurality of strain sensors 40 may be configured on a single turbine component 10 (e.g., a bucket) at various locations such that the strain may be determined at a greater number of locations about the individual turbine component 10. Alternatively or additionally, a plurality of like turbine components 10 (e.g., a plurality of buckets) may each have a strain sensor 40 configured in a standard location so that the amount of strain experienced by each specific turbine component 10 may be compared to other like turbine components 10. In even some embodiments, multiple different turbine components 10 of the same turbine unit (e.g., buckets and vanes for the same turbine) may each have a strain sensor 40 configured thereon so that the amount of strain experienced at different locations within the overall turbine may be determined.

Referring still to FIG. 2, a strain sensor 40 in accordance with the present disclosure may include one or more dimensions, such as a first dimension 80 and a second dimension 82. The first and second dimensions 80, 82 may be any suitable measurable dimensions of the strain sensor 40. For example, a dimension 80, 82 in some exemplary embodiments may be an outer peripheral dimension of the strain sensor 40 such as a height, width, diagonal measurement, etc. In other exemplary embodiments, a dimension 80, 82 may be an inner dimension of the strain sensor 40, such as distance D or another suitable distance, etc. In the embodiment shown in FIG. 2, dimension 80 is an outer height and dimension 82 is an outer width. A reference value 81, 83 may be defined for each respective dimension 80, 82. The reference values 81, 83 may generally be standard values of a standard size of the strain sensor 40, as determined for example by a user of the strain sensor 40.

Figure 5:
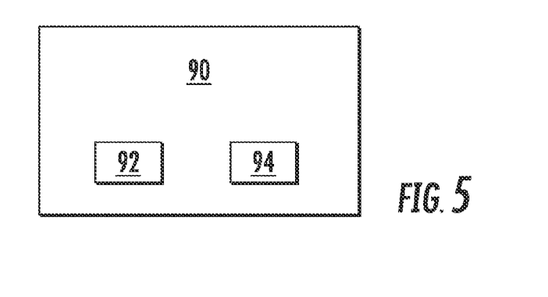
FIG. 5 is a schematic view of a computing device which may be utilized in accordance with embodiments of the present disclosure.

Referring now briefly to FIG. 5, in exemplary embodiments, reference values 81, 83 for dimensions 80, 82 may be stored in a computing device 90. Computing device 90 may include one or more processor(s) 92 and associated memory device(s) 94 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 94 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 94 may generally be configured to store suitable computer-readable instructions that, when implemented by the processor(s) 92, configure the computing device 90 to perform various functions such as those discussed herein. Reference values 81, 83 may, for example, be stored in a database within a memory device 94.

Figure 3:
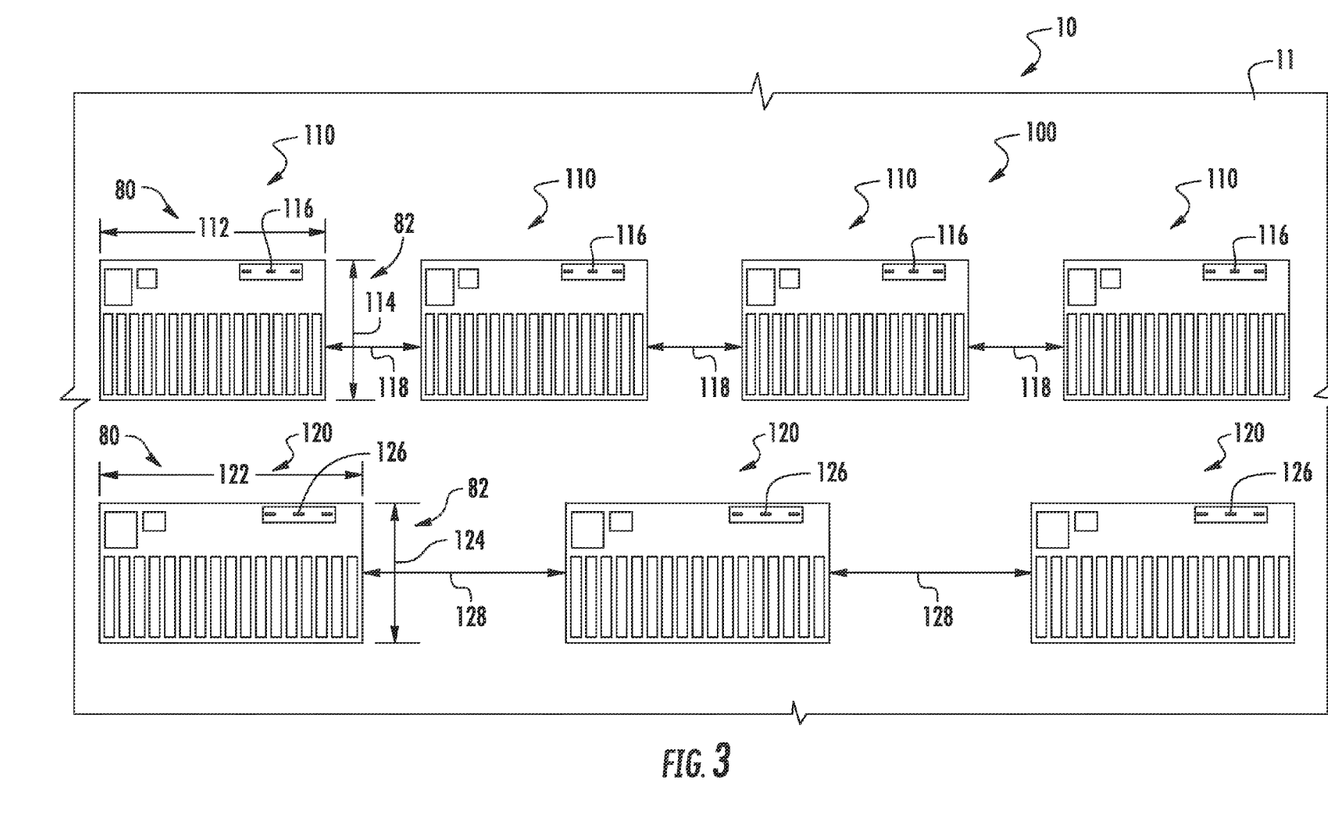
FIG. 3 is a top view of a first plurality of strain sensors and a second plurality of strain sensors configured on a turbine component in accordance with one embodiment of the present disclosure.
Figure 4:
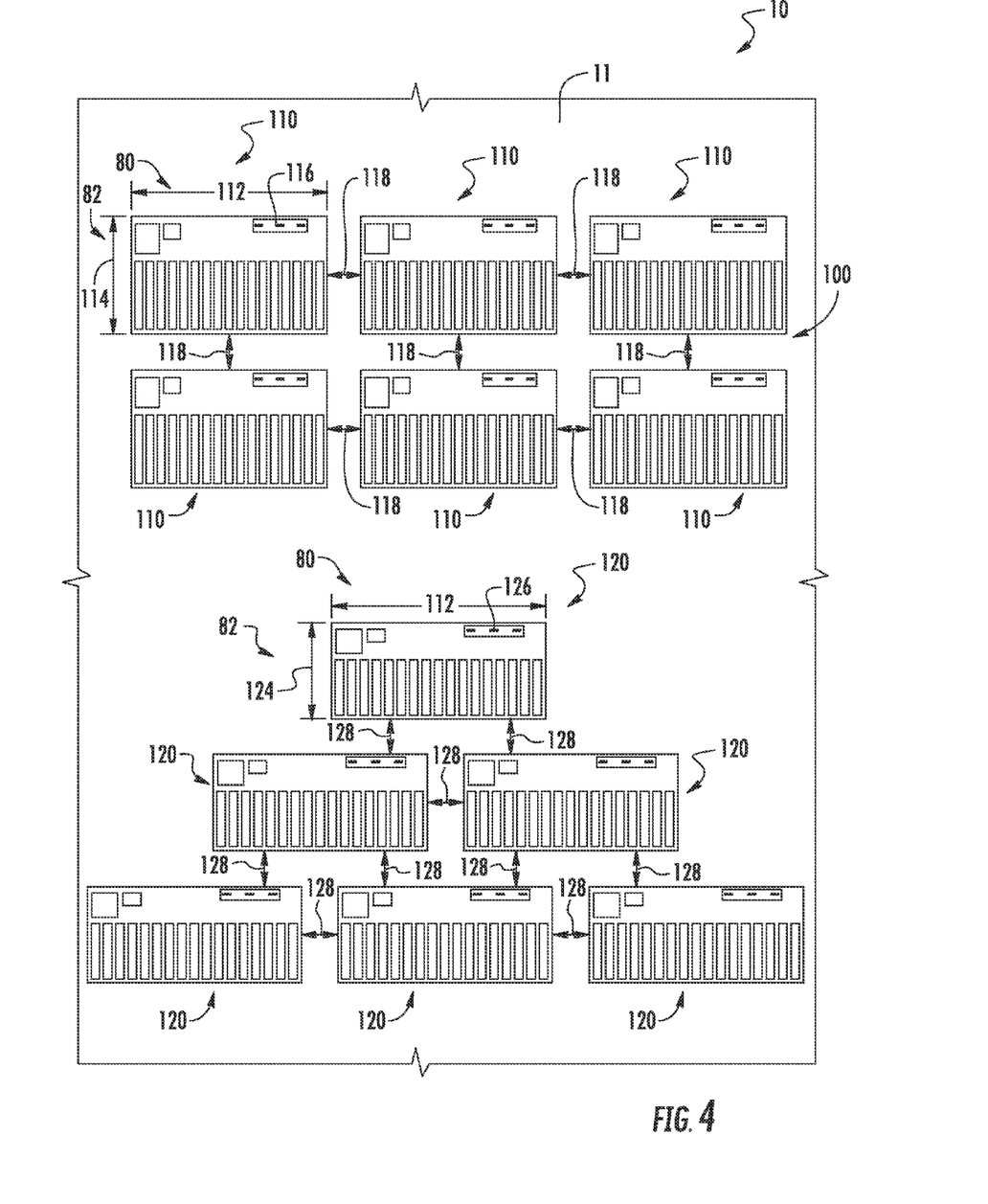
FIG. 4 is a top view of a first plurality of strain sensors and a second plurality of strain sensors configured on a turbine component in accordance with another embodiment of the present disclosure.

Referring now to FIGS. 3 and 4, embodiments of assemblies 100 for monitoring turbine component 10 deformation are provided. An assembly 100 may include, for example, one or more first strain sensors 110 and one or more second strain sensors 120. Each strain sensor 110, 120 may be configurable on a turbine component 10, and thus when assembled configured on the turbine component 10, such as on or beneath the exterior surface 11 thereof. Further, each strain sensor 110, 120, may include at least two reference points 41, 42, and may in some embodiments further include a unique identifier 47. Each strain sensor 110, 120 may further include various dimensions, such as first dimension 80 and second dimension 82. Notably, the dimensions discussed herein such as first dimensions 80 and second dimensions 82 of the first strain sensors 110 may correspond with each other, the dimensions discussed herein such as first dimensions 80 and second dimensions 82 of the second strain sensors 120 may correspond with each other, and the dimensions discussed herein such as first dimension 80 and second dimension 82 of a second strain sensor 120 may correspond with the dimensions discussed herein such as first dimension 80 and second dimension 82 of a first strain sensor 110. Accordingly, when referencing a first dimension 80 or second dimension 82 of a strain sensor 110, 120, the identical dimension (i.e. height, width, specified distance, etc.) is being referenced.

The dimensions of a first strain sensor 110 in accordance with the present disclosure may have various values. For example, first dimension 80 of first strain sensor 110 may have a value 112, and second dimension 82 of first strain sensor 110 may have a value 114. The dimensions of a second strain sensor 110 in accordance with the present disclosure may additionally have various values. First dimension 80 of second strain sensor 120 may have a value 122, and second dimension 82 of second strain sensor 120 may have a value 124.

Notably, the values 112, 114, 122, 124 as discussed herein may change during use of the turbine component 10 such as in a gas turbine system or other suitable turbomachine. Accordingly, when discussing changes in such values, the values may be referred to as initial values 112', 114', 122', 124' or measured values 112", 114", 122", 124". Initial values are values when the strain sensor 110, 120 is initially configured on a turbine component 10 before any subsequent use of the turbine component, whereas measured values are values after the turbine component has been in use.

In exemplary embodiments as illustrated in FIGS. 3 and 4, a value 122, such as an initial value 122', may be different from a value 112, such as an initial value 112'. Further, a value 124, such as an initial value 124', may be different from a value 114, such as an initial value 114'. Notably, values 112 and/or values 114, such as initial values 112' and/or 114', of each of a plurality of first strain sensors 110 may be identical to each other, and values 122 and/or values 124, such as initial values 122' and/or 124', of each of a plurality of second strain sensors 110 may be identical to each other.

Suitable mathematical operations may be utilized to determine the values 122, 124, such as the initial values 122', 124', and/or the values 112, 114, such as the initial values 112', 114'. Specifically, the values 122, 124, such as the initial values 122', 124', may each be the result of a first mathematical operation performed on the associated reference value 81, 83 for those dimensions. The values 112, 114, such as the initial values 112', 114', may in some embodiments be the associated reference values 81, 83 for those dimensions. Alternatively, however, the values 112, 114, such as the initial values 112', 114', may additionally each be the result of a second mathematical operation performed on the associated reference value 81, 83 for those dimensions. In these embodiments, the second mathematical operation used to obtain values 112, 114, such as the initial values 112', 114', may, for example, be different from the first mathematical operation used to obtain values 122, 124, such as initial values 122', 124'.

Notably, in some embodiments, the first mathematical operation used to obtain a value, such as value 112, 112', of a first strain sensor 110, may be identical to or different from the first mathematical operation used to obtain a value, such as value 114, 114', of the first strain sensor 110. Similarly, the second mathematical operation used to obtain a value, such as value 122, 122', of a second strain sensor 120, may be identical to or different from the second mathematical operation used to obtain a value, such as value 124, 124', of the second strain sensor 120.

A mathematical operation in accordance with the present disclosure may utilize any suitable mathematical equation, coefficient, etc. For example, in some embodiments, a mathematical operation, such as first or second mathematical operation, may be a multiplication of a reference value 81, 83 by a multiplier. The multiplier may, for example, be predetermined for a mathematical operation or randomly generated for a mathematical operation. Notably, the multiplier of a second mathematical operation may in exemplary embodiments be different from the multiplier of a first mathematical operation. Additionally or alternatively, a mathematical operation may include addition, subtraction, division, etc. and may include any number of coefficients which may be predetermined or randomly generated for the mathematical operation.

The mathematical operation associated with obtaining a value 112, 114, 122, 124, such as an initial value 112', 114', 122', 124' may be stored in computing device 90, such as in a database within a memory device 94. Further, the mathematical operation may be associated with the reference value 81, 83 on which it was utilized to obtain the value, and with the strain sensor(s) 110, 120 which utilized such value.

Modification of reference values 81, 83 via mathematical operations to obtain differing values 112, 114, 122, 124, such as an initial values 112', 114', 122', 124', may in some embodiments result in distortion of other components of the associated strain sensors 110, 120. The entire strain sensor 110, 120, and components thereof such as reference points 41, 42 and/or other inner or outer dimensions may be scaled along the dimension(s) 80, 82 due to modification of the reference values 81, 83 to the values 112, 114, 122, 124, such as initial values 112', 114', 122'. Accordingly, other dimensions such as distances D and/or other inner or outer dimensions may be scaled. In other embodiments, however, modification of reference values 81, 83 via mathematical operations to obtain differing values 112, 114, 122, 124, such as an initial values 112', 114', 122', 124', may not result in such distortion. In these embodiments, only the dimension(s) 82, 82 may be scaled, while other components such as reference points 41, 42 and/or inner or outer dimensions may remain constant.

As such, the use of mathematical operations to obtain values 112, 114, 122, 124, such as initial values 112', 114', 122', 124', advantageously reduces the risk of unauthorized use of the strain sensors 110, 120. For example, strain calculations can be cumulative calculations, wherein values for a dimension such as a distance D taken at different times (i.e. when the strain sensor 110, 120 is initially configured on a turbine component 10 before any subsequent use of the turbine component and then after the turbine component has been in use, or after differing time periods of use of the turbine component) are compared to determine strain. Since it is unlikely that an unauthorized user would be able to obtain initial values 112', 114', 122', 124' before a turbine component was installed for use, the unauthorized user would have no values to compare with subsequently obtained measured values 112", 114", 122", 124". Further, the use of multiple strain sensors 110, 120 having non-uniform values for dimensions 80, 82 would prevent the unauthorized user from backing out or estimating initial values.

Further, by storing the reference values 81, 83, mathematical operations, initial values 112', 114', 122', 124', etc., in computing device 90, authorized user can advantageously determine the initial values 112', 114', 122', 124' associated with strain sensors 110, 120 when obtaining measured values 112", 114", 122", 124" and calculating strain, etc. For example, as discussed reference values 81, 83, mathematical operations, initial values 112', 114', 122', 124', etc., may be associated in computing device 90 with strain sensors 110, 120. Further, as discussed, in exemplary embodiments, each strain sensor 110, 120 may include a unique identifier, such as a first unique identifier 116 for a first strain sensor 110 and a second unique identifier 126 for a second strain sensor 120. The first unique identifier 116 may be associated with the first mathematical operation(s) and associate values as discussed herein, and the second unique identifier 126 may be associated with the second mathematical operation(s) and associate values as discussed herein. Accordingly, by entering a unique identifier 116, 126 into the computing device 90, the associated information may easily be obtained.

As additionally illustrated in FIGS. 3 and 4, various pluralities of strain sensors, such as first strain sensors 110 and second strain sensors 120, may be configured on turbine components 10 in particular patterns. A pattern in accordance with the present disclosure is generally a particular shape or geometry of the arrangement of a plurality of strain sensors (irrespective of the number of strain sensors in the pattern). For example, FIGS. 3 and 4 each illustrate first strain sensors 110 arranged in a first pattern and second strain sensors 120 arranged in a second pattern. In FIG. 3, the patterns, in this embodiment rows, are identical. In FIG. 4, the patterns, in this case a rectangle for first strain sensors 110 and a triangle for second strain sensors 120, are different. The pattern associated with a plurality of strain sensors 110, 120 may additionally be stored in computing device 90 and associated with the strain sensors 110, 120, such as with the unique identifiers 116, 126 thereof.

Further, neighboring first strain sensors 110 may be spaced apart from each other by first distances 118, and neighboring second strain sensors 120 may be spaced apart from each other by second distances 128. In exemplary embodiments as shown, a second distance 128 may be different from a first distance 118. Further, in exemplary embodiments, first distances 118 for a plurality of first strain sensors 110 may be identical to each other and second distances 128 for a plurality of second strain sensors 120 may be identical to each other. Alternatively, however, the first distances 118 may be different from each other and/or second distances 128 may be different from each other. The distances 118, 128 associated with a plurality of strain sensors 110, 120 may additionally be stored in computing device 90 and associated with the strain sensors 110, 120, such as with the unique identifiers 116, 126 thereof.

Use of non-uniform patterns and distances for groups of strain sensors 110, 120 may further advantageously reduce the risk of unauthorized use of the strain sensors 110, 120, by increasing the difficulty for the unauthorized user of determining initial values 112', 114', 122', 124'.

Figure 6:
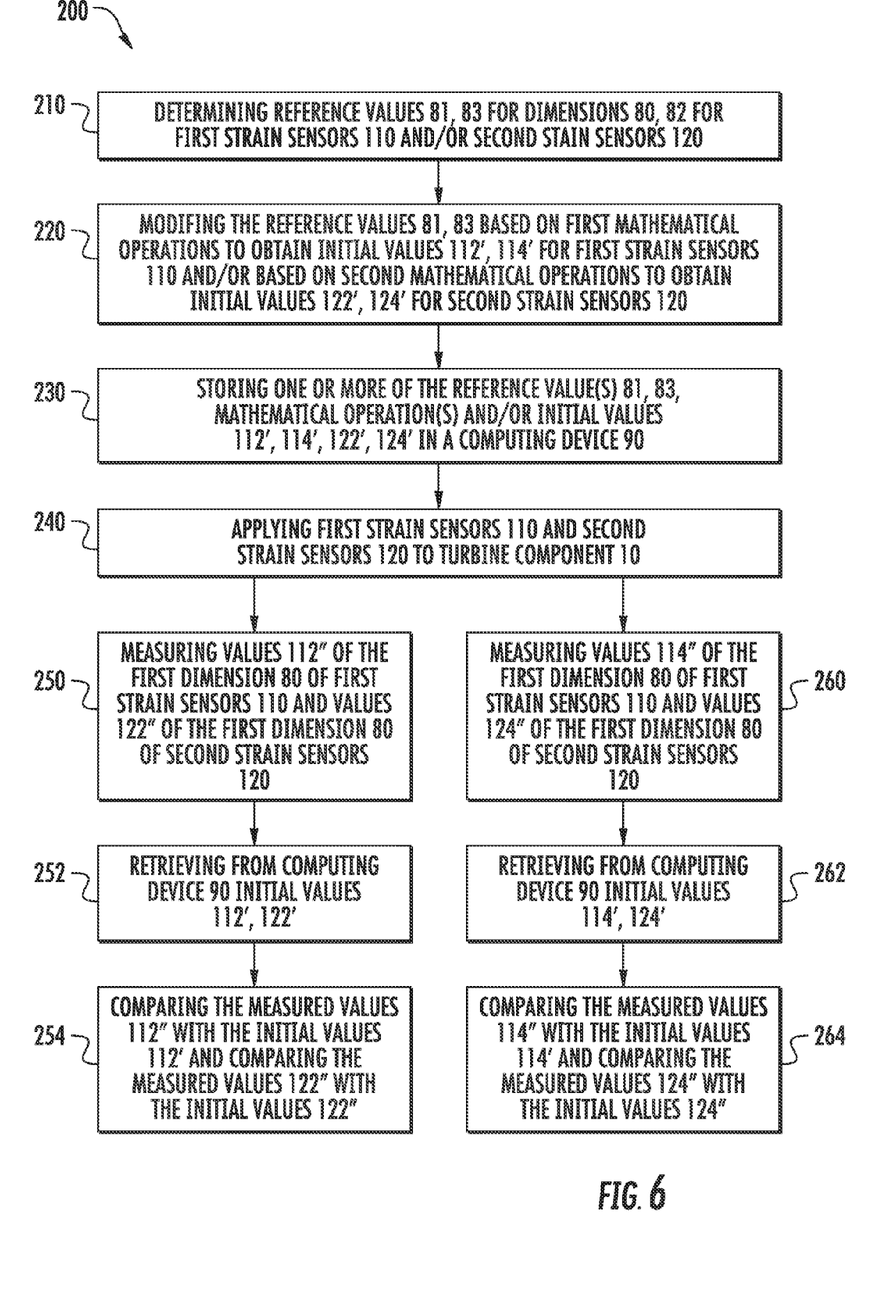
FIG. 6 is a flow chart illustrating a method in accordance with one embodiment of the present disclosure.

Referring now to FIG. 6, the present disclosure is further directed to methods 200 for monitoring turbine component 10 deformation. A method may include, for example, the step 210 of determining one or more reference values 81, 83 for one or more first strain sensors 110 and/or second strain sensors 120, as discussed herein. Method 200 may further include the step 220 of modifying the reference values 81, 83 based on first mathematical operations to obtain initial values 112', 114' and/or based on second mathematical operations to obtain initial values 122', 124', as discussed herein. Method 200 may further include the step 230 of storing one or more of the reference value(s) 81, 83, mathematical operation(s) and/or initial values 112', 114', 122', 124' in a computing device 90, as discussed herein. Method 200 may further include the step 240 of applying first strain sensors 110 and second strain sensors 120 to the turbine component 10, such that the strain sensors 110, 120 are configured on the turbine component 10, as discussed herein.

Method 200 may further include, for example, the step 250 of measuring a value 112" of the first dimension 80 of one or more first strain sensors 110 and a value 122" of the first dimension 80 of one or more second strain sensors 120. Any suitable measurement technique and/or apparatus may be utilized for such measurements.

Method 200 may further include the step 252 of retrieving from computing device 90 initial values 112', 122'. The initial values 112', 122' may be retrieved by simply accessing the values 112', 122' themselves, such as by opening a database in which the initial values 112', 122' are saved and accessing the values 112', 122', or may be retrieved by calculating the initial values 112', 122' utilizing mathematical operations and reference value 81 stored in computing device 90, such as in databases therein. As discussed, in exemplary embodiments, such information may be associated with strain sensors 110, 120 such as via unique identifiers 116, 126. Accordingly, in some embodiments, unique identifiers 116, 126 may be entered into computing device 90 to retrieve, for example, initial values 112', 122', mathematical operations, and/or reference values 81.

Method 200 may further include the step 254 of comparing the measured value 112" with the initial value 112' and comparing the measured value 122" with the initial value 122", such as to perform a strain calculation, as discussed herein.

Method 200 may still further include, for example, the step 260 of measuring a value 114" of the second dimension 82 of one or more first strain sensors 110 and a value 124" of the second dimension 82 of one or more second strain sensors 120. Any suitable measurement technique and/or apparatus may be utilized for such measurements.

Method 200 may further include the step 262 of retrieving from computing device 90 initial values 114', 124'. The initial values 114', 124' may be retrieved by simply accessing the values 114', 124' themselves, such as by opening a database in which the initial values 114', 124' are saved and accessing the values 114', 124', or may be retrieved by calculating the initial values 114', 124' utilizing mathematical operations and reference value 83 stored in computing device 90, such as in databases therein. As discussed, in exemplary embodiments, such information may be associated with strain sensors 110, 120 such as via unique identifiers 116, 126. Accordingly, in some embodiments, unique identifiers 116, 126 may be entered into computing device 90 to retrieve, for example, initial values 114', 124', mathematical operations, and/or reference values 83.

Method 200 may further include the step 264 of comparing the measured value 114" with the initial value 114' and comparing the measured value 124" with the initial value 124", such as to perform a strain calculation, as discussed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An assembly for monitoring turbine component deformation, the assembly comprising:
a first strain sensor configurable on the turbine component, the first strain sensor comprising at least two reference points and having a first dimension;
a second strain sensor configurable on the turbine component, the second strain sensor comprising at least two reference points and having a first dimension which corresponds to the first dimension of the first strain sensor, wherein an initial value of the first dimension of the second strain sensor is different from an initial value of the first dimension of the first strain sensor.

2. The assembly of claim 1, wherein the first strain sensor further comprises a second dimension and the second strain sensor further comprises a second dimension which corresponds to the second dimension of the first strain sensor, and wherein an initial value of the second dimension of the second strain sensor is different from an initial value of the second dimension of the first strain sensor.

3. The assembly of claim 1, wherein the first strain sensor is a plurality of first strain sensors and the second strain sensor is a plurality of second strain sensors.

4. The assembly of claim 3, wherein neighboring first strain sensors are spaced apart from each other by first distances and neighboring second strain sensors are spaced apart from each other by second distances, and wherein a second distance between two neighboring second strain sensors is different from a first distance between two corresponding neighboring first strain sensors.

5. The assembly of claim 4, wherein the first distances have identical initial values and the second distances have identical initial values.

6. The assembly of claim 3, wherein the plurality of first strain sensors are arranged in a first pattern and the plurality of second strain sensors are arranged in a second pattern different from the first pattern.

7. The assembly of claim 1, wherein the initial value of the first dimension of the second strain sensor is the results of a mathematical operation performed on a reference value for the first dimension.

8. The assembly of claim 7, wherein the initial value of the first dimension of the first strain sensor is the reference value.

9. The assembly of claim 7, wherein the initial value of the first dimension of the first strain sensor is the results of a mathematical operation performed on the reference value for the first dimension, the mathematical operation for the initial value of the first dimension of the first strain sensor different from the mathematical operation for the initial value of the first dimension of the second strain sensor.

10. The assembly of claim 9, wherein the first strain sensor further comprises a first unique identifier and the second strain sensor further comprises a second unique identifier, and wherein the first unique identifier is associated with the mathematical operation for the initial value of the first dimension of the first strain sensor and the second unique identifier is associated with the mathematical operation for the initial value of the first dimension of the second strain sensor.

11. The assembly of claim 1, wherein the first dimension is an outer height.

12. The assembly of claim 1, wherein the first dimension is an outer width.

13. The assembly of claim 1, wherein the first dimension is a distance between the at least two reference points.

14. A method for monitoring turbine component deformation, the method comprising:
measuring a value of a first dimension of a first strain sensor and a value of a first dimension of a second strain sensor configured on the turbine component, the first dimension of the second strain sensor corresponding to the first dimension of the first strain sensor;
retrieving from a computing device an initial value for the first dimension of the first strain sensor and an initial value for the first dimension of the second strain sensor, the initial value of the first dimension of the second strain sensor different from the initial value of the first dimension of the first strain sensor; and
comparing the measured value of the first dimension of the first strain sensor with the initial value of the first dimension of the first strain sensor and the measured value of the first dimension of the second strain sensor with the initial value of the first dimension of the second strain sensor.

15. The method of claim 14, further comprising:
measuring a value of a second dimension of the first strain sensor and a value of a second dimension of the second strain sensor, the second dimension of the second strain sensor corresponding to the second dimension of the first strain sensor;
retrieving from a computing device an initial value for the second dimension of the first strain sensor and an initial value for the second dimension of the second strain sensor, the initial value of the second dimension of the second strain sensor different from the initial value of the second dimension of the first strain sensor;
comparing the measured value of the second dimension of the first strain sensor with the initial value of the second dimension of the first strain sensor and the measured value of the second dimension of the second strain sensor with the initial value of the second dimension of the second strain sensor.

16. The method of claim 14, wherein the first strain sensor is a plurality of first strain sensors and the second strain sensor is a plurality of second strain sensors.

17. The method of claim 14, further comprising:
determining a reference value for the first dimension of the first strain sensor and the first dimension of the second strain sensor;
modifying the reference value based on a first mathematical operation to obtain the initial value for the first dimension of the first strain sensor and modifying the reference value based on a second mathematical operation to obtain the initial value for the first dimension of the second strain sensor; and
storing at least one of the reference value, the first and second mathematical operations or the initial values for the first dimensions of the first and second strain sensors in a computing device.

18. The method of claim 17, further comprising:
applying the first strain sensor and the second strain sensor to the turbine component, the first strain sensor and second strain sensor each comprising at least two reference points.

19. The method of claim 17, wherein the first mathematical operation is a multiplication of the reference value by a predetermined multiplier and the second mathematical operation is a multiplication of the reference value by a predetermined multiplier different from the predetermined multiplier of the first mathematical operation.

20. The method of claim 17, wherein the first mathematical operation is a multiplication of the reference value by a randomly generated multiplier and the second mathematical operation is a multiplication of the reference value by a randomly generated multiplier different from the randomly generated multiplier of the first mathematical operation.

* * * * *